United States Patent [19]

Krantz

[11] Patent Number: 4,711,096
[45] Date of Patent: Dec. 8, 1987

[54] LEAK DETECTION AND REFRIGERANT PURGING SYSTEM

[76] Inventor: Herman F. Krantz, 728 Benton Ct., Elmhurst, Ill. 60126

[21] Appl. No.: 23,898

[22] Filed: Mar. 13, 1987

Related U.S. Application Data

[63] Continuation of Ser. No. 840,158, Mar. 17, 1986, abandoned.

[51] Int. Cl.$^4$ .......................... F25B 45/00; F16F 1/34
[52] U.S. Cl. ........................................ 62/129; 62/149; 165/71
[58] Field of Search ............... 62/125, 126, 127, 129, 62/130, 149; 165/11.1, 71, 70; 340/605

[56] References Cited

U.S. PATENT DOCUMENTS

| 761,701 | 6/1904 | Palmer | 62/149 |
| 4,138,856 | 2/1979 | Orlowski | 165/70 X |
| 4,319,628 | 3/1982 | Hughes | 165/71 X |
| 4,644,755 | 2/1987 | Esslinger et al. | 62/149 X |

FOREIGN PATENT DOCUMENTS 0022898  2/1983  Japan ..................... 165/71

Primary Examiner—Harry B. Tanner
Attorney, Agent, or Firm—Robert F. Van Epps

[57] ABSTRACT

A system for sensing a leak of ammonia refrigerant into a refrigerated environment and for automatically purging the refrigeration equipment within the environment of refrigerant.

3 Claims, 1 Drawing Figure

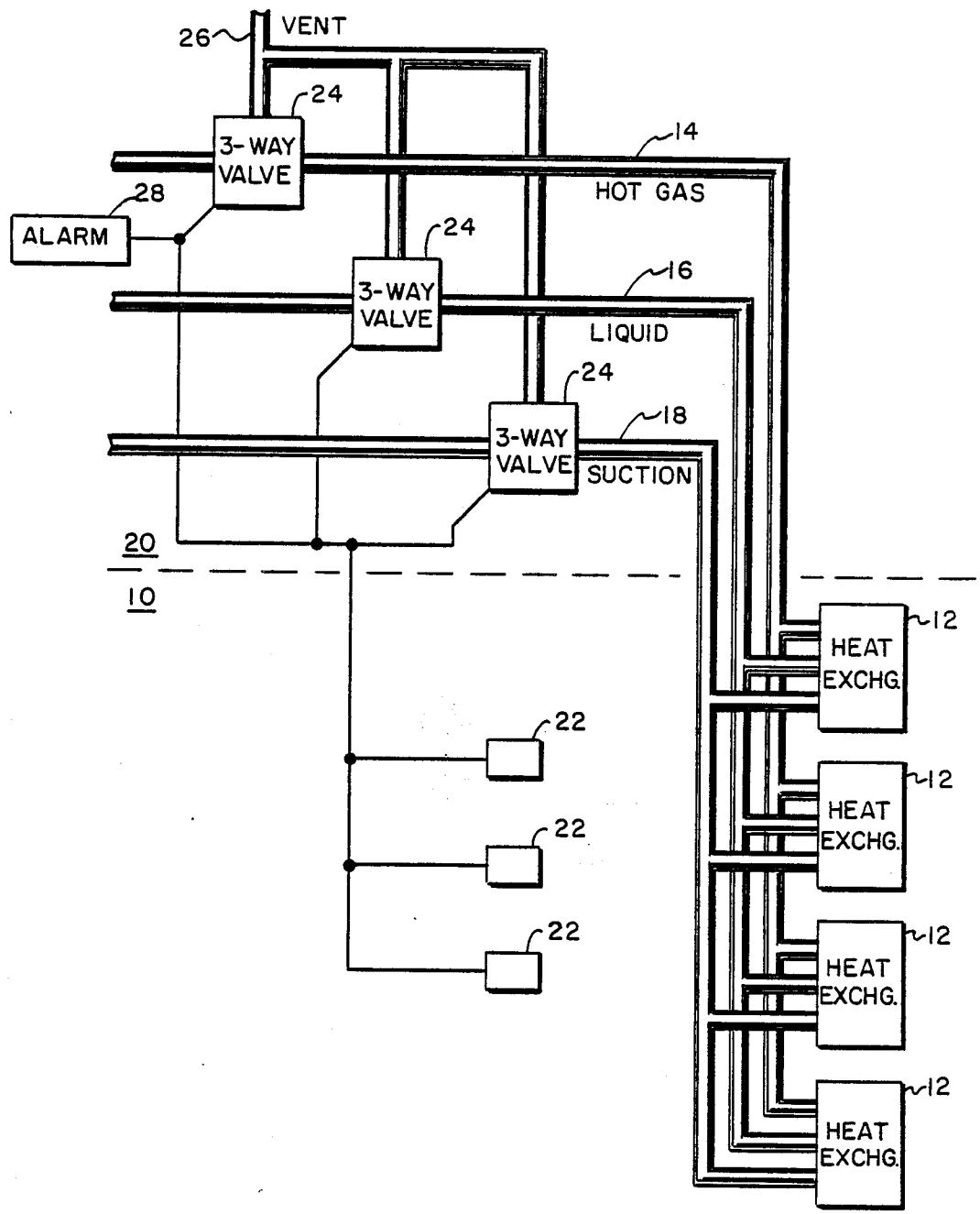

LEAK DETECTION AND REFRIGERANT PURGING SYSTEM

This application is a continuation of application Ser. No. 840,158, filed Mar. 17, 1986 now abandoned.

BACKGROUND OF THE INVENTION

1. Field of the Invention

The present invention relates generally to the field of commercial refrigeration systems and more particularly to an improved system for detecting a refrigerant leak and automatically purging the refrigeration system.

2. Description of the Prior Art

Many commercial refrigeration systems operate with ammonia as a refrigerant. In the event of a refrigerant leak into the interior of the refrigerator/freezer vaporous ammonia will contaminate the products being stored.

Prior to the present invention the most common method of detecting refrigerant leaks was to periodically manually inspect the refrigerated area. It has also been known to use ammonia detectors in the refrigerated environment to activate an alarm and/or interrupt refrigerant flow in the system. Even when the refrigerant flow is interrupted there can be substantial amounts of pressurized ammonia within the refrigerated environment. Prior art leak detection systems do not address the problem of continued refrigerant leakage from this source and the attendant product contamination which results.

OBJECTIVES AND SUMMARY OF THE INVENTION

From the preceding discussion it will be understood that among the various objectives of the present invention are included the following:

the provision of a new and improved system for detecting leaks in a refrigeration system and for purging the system of refrigerant and thereby minimize contamination of stored products, and the provision of a system of the above-described character which is automatic in operation;

These and other objectives of the present invention are efficiently achieved by providing the refrigeration system with three-way valves in the refrigerant lines which are operated in response to an output from any of several ammonia sensors located in the refrigerated environment to interrupt refrigerant flow to the system and automatically vent the ammonia in the lines and heat exchangers, from the refrigerated environment.

The foregoing as well as other objects features and advantages of the present invention will be more readily understood from the following detailed description taken in conjunction with the appended drawings.

BRIEF DESCRIPTION OF THE DRAWING

The single appended drawing is a schematic diagram of a refrigeration system in accordance with the principles of the present invention.

DESCRIPTION OF PREFERRED EMBODIMENT

Turning now to FIG. 1 there is shown a commercial refrigerator/freezer 10 having a plurality of heat exchanger units 12 disposed therein. Each heat exchanger 12 is coupled in parallel with the others via a hot gas line 14, liquid line 16 and suction line 18 to an equipment room 20 located externally of the refrigerator/freezer 10 housing the compressor/condenser portions (not shown) of the system.

A plurality of ammonia detectors 22 are dispersed throughout the refrigerator/freezer 10 and are coupled in parallel with each of three three-way valves 24, one located in each of the lines 14, 16 and 18. As an alternative separate two-way valves could be used in each line. The valves 24 are normally open during the cooling cycle to permit the flow of refrigerant to and from the heat exchangers 12 and closed to the vent 26.

In the event of an ammonia leak from any of the heat exchangers 12 or lines 14, 16 or 18 within the refrigerator/freezer 10 the closest detector 22 produces an output signal which operates to actuate the valves 24 to interrupt the flow of refrigerant from the compressor/condenser and vent the lines 14, 16 and 18 to the outside of the refrigerator/freezer 10 via vent line 26. Typically the amount of ammonia in the interior of the refrigerator/freezer 10 is such that it can be vented directly to the atmosphere. For larger systems the present invention could be used with more sophisticated disposal or collection arrangements.

Where the present invention is used with multiple refrigerator/freezer units served by a common compressor/condenser a leak detected in any one unit will vent only that unit and leave the remainder in normal operating condition. The leak detectors 22 could also be coupled to an alarm system 28, however, since the refrigerator/freezer 10 will automatically have been purged of refrigerant, the urgency of operator action is greatly reduced.

From the foregoing discussion it will be understood that the applicant has provided a new and improved leak detection and refrigerant purging system whereby the objectives set forth hereinabove are efficiently achieved. Since certain changes in the above-described construction will occur to those skilled in the art without departure from the scope of the invention, it is intended that all matter set forth in the preceding description or shown in the accompanying drawing shall be interpreted as illustrated and not in a limiting sense.

Having described what is new and novel and desired to secure by Letters Patent, what is claimed is:

1. Apparatus responsive to refrigerant leaks occurring in that portion of a refrigerant system disposed within a refrigerated environment comprising
   at least one sensor disposed within said refrigerated environment for detecting leakage of refrigerant into said environment and producing an output signal in response thereto; and
   valve means disposed in the path of refrigerant flow, coupled to said sensor, and operative in response to said output signal to interrupt the flow of refrigerant to that portion of said refrigeration system within said environment and for venting only that refrigerant as may be in said portion of said system to the outside of said environment.

2. Apparatus as recited in claim 1 wherein
   said valve means comprises a three-way valve disposed in each of a plurality of refrigerant paths, normally open to permit the flow of refrigerant through said refrigeration system, and, when actuated, operating to block refrigerant flow to that portion of said refrigeration system within said refrigerated environment and to vent that portion of each of said plurality of refrigerant paths outside said refrigerated environment.

3. Apparatus as recited in claim 1 further including
   alarm means coupled to said sensor and operative in response to said output signal to indicate the existence of a refrigerant leak.

* * * * *